United States Patent
Kasper et al.

(10) Patent No.: US 8,054,712 B1
(45) Date of Patent: Nov. 8, 2011

(54) AUTONOMOUS HYDROPHONE POSITION LOCATING AND TARGET TRACKING SYSTEM

(75) Inventors: Rolf G. Kasper, Old Lyme, CT (US); Peter H. Hulton, Marion, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 283 days.

(21) Appl. No.: 12/587,332

(22) Filed: Sep. 30, 2009

(51) Int. Cl.
  *G01S 3/802* (2006.01)
(52) U.S. Cl. .................................................. 367/128
(58) Field of Classification Search .............. 367/128
  See application file for complete search history.

(56) References Cited

U.S. PATENT DOCUMENTS 4,114,393 A * 9/1978 Engle et al. .................. 114/264

* cited by examiner

*Primary Examiner* — Daniel Pihulic
(74) *Attorney, Agent, or Firm* — James M. Kasischke; Jean-Paul A. Nasser; Michael P. Stanley

(57) ABSTRACT

An autonomous hydrophone position locating and target tracking system employing a string or array of acoustic hydrophone equipped apparatuses that are easily and rapidly deployed over the ocean bottom within a preselected volume of water. For each bottom residing hydrophone, a dedicated cable provides surface location based on satellite generated GPS positioning data. Special real time cable deflection algorithms resident in the base unit electronic processor are continuously updated using the velocity gradient inputs from several in-line velocimeters positioned at different depths along the cable. The shape of the tether cable and the resulting position of the bottom unit mounted hydrophone is then back calculated in real time in three dimensions from the known global position of the surface buoy.

11 Claims, 2 Drawing Sheets

US 8,054,712 B1

AUTONOMOUS HYDROPHONE POSITION LOCATING AND TARGET TRACKING SYSTEM

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to an autonomous hydrophone position locating and tracking system, and more particularly to a distributed array of buoy tethered autonomous hydrophone position locating apparatuses, where each such apparatus further includes a plurality of water velocity sensors deployed at selected depths along a cable that is connected at one end to a top side buoy that obtains buoy surface position data via a satellite based GPS link, and that is also connected at the other end to a bottom residing base unit that contains a hydrophone and also electronic signal processing components that receive the water velocity gradient data from the velocity sensors and the GPS position data from the surface buoy, and employs the data to determine the exact bottom location of that particular hydrophone which is then relayed to a satellite via the RF capable buoy antenna. Collectively the multi-hydrophone configuration provides an autonomous underwater hydrophone position locating and target tracking system that enables highly accurate position locating of the tracked objects. The system can be easily and quickly deployed to provide efficient underwater vehicle tracking. In addition, the system can be used to provide forward area anyplace-anytime test and evaluation range deployment capabilities.

(2) Description of the Prior Art

It is well known in the target tracking art to deploy a plurality of hydrophones over the ocean bottom in a dispersed pattern to effect a sensor string or array. However, the tracking accuracy of existing hydrophone sensor data output is greatly affected by the accuracy with which the relative position of the individual hydrophones is known in real time. Current methods for deploying hydrophone strings require that an expensive site survey be conducted to determine the initial bottom resting position of each individual hydrophone in the system. Over time, and especially for littoral water deployments, tether cables can be subjected to severe wave and tidal variations that may displace individual hydrophones over time which can in turn significantly impact the accuracy of overall system tracking solutions leading to a need to recalibrate. Recalibration of the deployed hydrophones presently requires that additional periodic costly site surveys be conducted. The need for further site surveys also prevents stealth deployment when tracking is desired in hostile waters.

What is needed is a way to overcome the inherent unreliable hydrophone position information associated with existing range systems by providing a quickly deployable acoustic hydrophone position locating system capable of continuous, accurate determination of each bottom deployed hydrophone's location in real time in order to permit the most accurate hydrophone string or array output data to the system.

SUMMARY OF THE INVENTION

Accordingly, it is a general purpose and object of the present invention to provide an autonomous, buoy tethered, bottom deployed, real time hydrophone position locating system.

It is a further object that the hydrophone locating system be easily deployable.

Another object is to have the hydrophone locating system be adaptable for rapid use as a test and evaluation system, especially in littoral waters.

These objects are accomplished with the present invention by providing an autonomous hydrophone position locating and target tracking system employing a string or array of acoustic hydrophone equipped apparatuses that are easily and rapidly deployed over the ocean bottom within a preselected volume of water. Each apparatus provides accurate position data for its base unit mounted hydrophone resulting in a system that permits accurate target tracking on-the-fly and also has forward area anyplace-anytime test and evaluation capabilities. For each bottom residing hydrophone, a dedicated cable tethered to a top side buoy provides surface location based on satellite generated GPS positioning data. Special real time cable deflection algorithms resident in the base unit electronic processor are continuously updated using the velocity gradient inputs from several in-line velocimeters positioned at different depths along the cable. The shape of the tether cable and the resulting position of the bottom unit mounted hydrophone is then back calculated in real time in three dimensions from the known global position of the surface buoy. The bottom residing base unit also includes the power supply for operating the apparatus. The surface buoy has the Global Positioning System (GPS) capability and also a Radio Frequency (RF) component with an antenna, to allow transmission of the hydrophone's position to a system consolidator. Together, a preselected number of these apparatuses provide an autonomous hydrophone position locating and target tracking system that provides highly accurate position location of the individual system hydrophones and hence accurate target tracking.

BRIEF DESCRIPTION OF THE DRAWING

A more complete understanding of the invention and many of the attendant advantages thereto will be readily appreciated as the same becomes better understood by reference to the following detailed description when considered in conjunction with the accompanying drawings wherein.

DETAILED DESCRIPTION OF THE INVENTION

Figure 1:
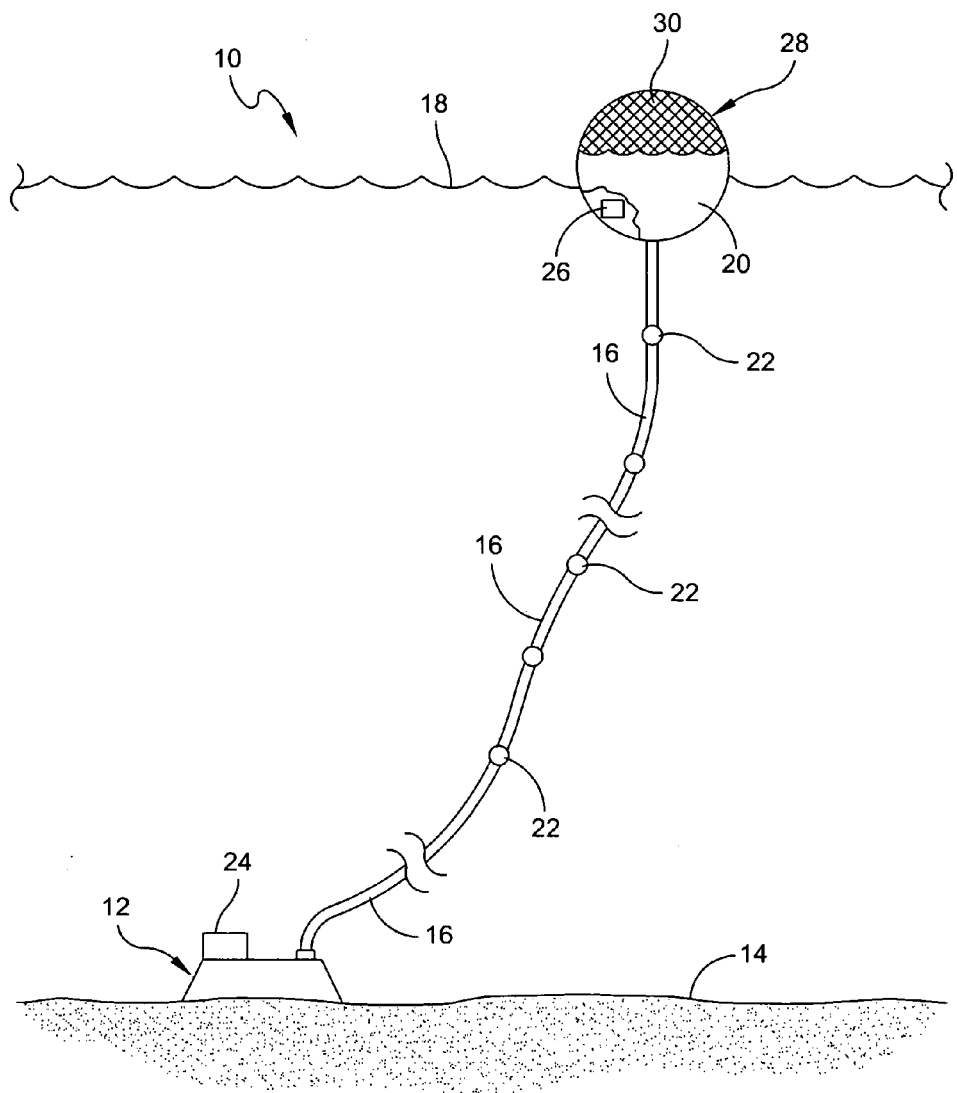
FIG. 1 shows a typical autonomous hydrophone position locating apparatus built according to the teachings of the present invention.

The tracking system of the instant invention includes a plurality of bottom deployed acoustic sensing hydrophone apparatuses, each FIG. 1 depicted hydrophone apparatus being positioned so as to, as part of a whole, form a desired tracking system configuration. Due to many dynamic ocean forces acting on an individual base unit during deployment and operation, the initial position of each hydrophone may shift over time. Knowledge of real time, actual position of each hydrophone is necessary for accurate tracking of moving underwater objects.

Referring now to FIG. 1 there is shown a typical autonomous hydrophone position locating apparatus generally identified as 10. Apparatus 10 includes a deployed base unit 12 that rests on the surface of an ocean bottom 14. Base unit 12 acts as the anchor for apparatus 10. An array cable 16 is connectively attached to base unit 12 and extends upward to the ocean surface 18 where it is in turn connectively attached to a buoy assembly 20. In the preferred embodiment, several low cost velocimeters, 22, are positioned at preselected intervals along the length of cable 16 to measure the ocean velocity gradients at various depths. A hydrophone 24 is affixed to the exterior of base unit 12 and connects to the interior thereof. Buoy assembly 20 includes a CP-GPS device coupled to a HF RF device, the combined device functions being shown generally in FIG. 1 as 26, which is housed within buoy 20. Buoy assembly 20 employs an inflatable rubber structure 28 with direct write technology shown applied as an antenna 30. Antenna 30 may be either printed on the dry interior buoy surface above the buoy's waterline, or as an alternative, may be an antenna formed by employing multi-retro-reflective technology applied on the portion of the exterior surface of the buoy that remains above the water line.

Figure 2:
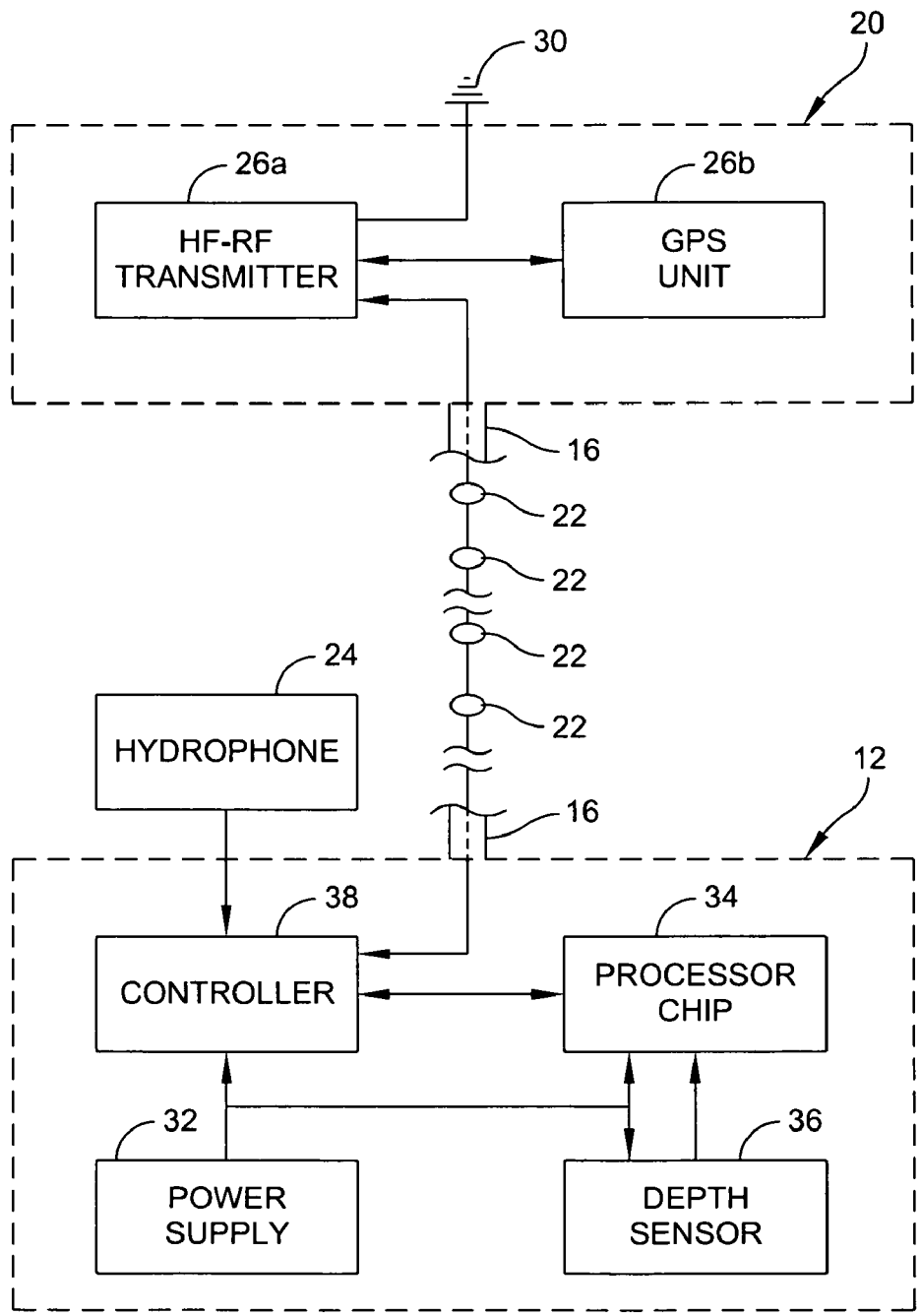
FIG. 2 shows a block diagram of the electrical circuit of the apparatus of FIG. 1.

Referring now to the block diagram of FIG. 2, the interior of base unit 12 further includes a single apparatus power supply 32 that provides power within base unit 12 to an electronic processor chip 34 that incorporates a special deflection algorithm described in greater detail below, a depth sensor 36, and an apparatus controller 38. Depth sensor 36 provides base unit depth readings to processor chip 34 for use by its algorithm. Controller 38 manages the information flow between processor chip 34 and surface buoy assembly 20, and in addition provides operational power to all cable and buoy assembly components. Surface buoy assembly 20 includes an HF-RF transmitter 26a connected to antenna 30, and a GPS unit 26b that feeds buoy assembly 20's location information to the transmitter 26a and to the base unit processor 3'4. Buoy assembly 20 connects to base unit 12 by means of cable 16 having a multi-depth array of velocimeters 22 arranged at preselected intervals thereon. In the preferred embodiment the plurality of array sensor elements are low cost velocity accelerators.

Using the ocean velocity gradients, the GPS position of buoy assembly 20 and the initial position of base unit 12 as inputs, the deflection algorithm back calculates the relative three dimensional position of the base unit 12, the buoy assembly 20 and the shape of cable 16. The relative position information is next used, to determine the real time global position coordinates of hydrophone 24 attached to base unit 12. This hydrophone position information is then relayed back via satellite to a remote at sea or land based control center using the HF-RF transmitter 26b capability for target tracking.

The primary advantage of the present invention is that it provides significantly enhanced hydrophone position location data. The autonomous sensor positioning and tracking system supports efficient traditional and future tracking on-the-fly and forward area anyplace-anytime test and evaluation capabilities. This includes TSPI and, acoustic and non-acoustic measurement and analysis. This technology provides high accuracy test and evaluation data including the ability to provide ultra complex test and evaluation scenarios such as salvo launch. With the maturing of Free Space Optical Telemetry (FSOT) (in the near term use HF RF communication links), the autonomous hydrophone position locating and tracking system of the present invention will provide collaborative test and evaluation capabilities such as connectivity of USW test and training events for joint distributed test and evaluation with live, virtual, and constructive assets. It can also provide ship systems connectivity with the joint distributed test and evaluation infrastructure for data acquisition, archive and distribution. The autonomous hydrophone position locating and tracking system will also support test and evaluation of new and emerging systems such as shallow water littoral warfare test environments and range capabilities that enhance test and evaluation of large and medium UDNS systems and unmanned vehicles.

What has thus been described is an autonomous hydrophone position locating and target tracking system employing a string or array of acoustic hydrophone equipped apparatuses that are easily and rapidly deployed over the ocean bottom within a preselected volume of water. Each apparatus provides accurate position data for its base unit mounted hydrophone resulting in a system that permits accurate target tracking on-the-fly and also has forward area anyplace-anytime test and evaluation capabilities. For each bottom residing hydrophone, a dedicated cable tethered to a top side buoy provides surface location based on satellite generated GPS positioning data. Special real time cable deflection algorithms resident in the base unit electronic processor are continuously updated using the velocity gradient inputs from several in-line velocimeters positioned at different depths along the cable. The shape of the tether cable and the resulting position of the bottom unit mounted hydrophone is then back calculated in real time in three dimensions from the known global position of the surface buoy. The bottom residing base unit also includes the power supply for operating the apparatus. The surface buoy has the Global Positioning System (GPS) capability and also a Radio Frequency (RF) component with an antenna, to allow transmission of the hydrophone's position to a system consolidator. Together, a preselected number of these apparatuses provide an autonomous hydrophone position locating and target tracking system that provides highly accurate position location of the individual system hydrophones and hence accurate target tracking.

Obviously many modifications and variations of the present invention may become apparent in light of the above teachings. For example: a single base unit mounted optical. Doppler velocimeter may be used to provide the ocean velocity gradient data in lieu of the plurality of low cost cable mounted velocimeters, although this would incur a much greater cost to implement. Antenna 30 may be applied inside or outside the surface of the inflatable rubber structure 28. Additional sensors may also be deployed on cable 16 such as salinity, temperature or even additional hydrophones.

In light of the above, it is therefore understood that within the scope of the appended claims, the invention may be practiced otherwise than as specifically described.

What is claimed is:

1. An autonomous hydrophone position locating and target tracking system, for deployment within a preselected volume of water, said water volume having a top surface, a bottom surface, and access to one or more overhead satellites, said system further including a plurality of distributed autonomous apparatuses, each said apparatus comprising:

an array tether cable having a top end and a bottom end, said cable being disposed between said surface of said body of water and said ocean bottom surface;

velocimeter means, attached to said array cable at discreet intervals, for determining water velocity gradients at preselected water depths;

a buoy assembly floating on said ocean surface, said buoy assembly being connectably attached to the top end of said array tether cable, for communicating therewith and with said satellite;

a base unit, deployed on said ocean bottom, said base unit being connectably attached to the bottom end of said array tether cable for communicating therewith; and a hydrophone, connectably attached to the exterior of said base unit, for receiving target generated acoustic signals and transmitting said signals via said base unit, said array cable and said surface buoy to said satellite.

2. The system of claim 1 wherein said velocimeter means further comprises a plurality of optical velocimeters disposed in spaced apart relationship at various preselected water depths along said array cable, for determining the velocity gradient data at each depth and transmitting said data to said base unit.

3. The system of claim 2 wherein said surface deployed buoy assembly further comprises:

an enclosed inflatable rubber structure, attached to said array tether cable, for supporting said cable while receiving and transmitting system data;

a GPS device, disposed within said floatation housing, for communicating with said satellite and acquiring accurate position location of said buoy;

an RF transmitter, disposed within said rubber structure, for communicating between said buoy assembly and said satellite; and an antenna, disposed on said rubber structure and connectably attached to said RF transmitter, for providing a link between said transmitter and said satellite.

4. The system of claim 3 wherein said bottom deployed base unit further comprises:

a depth sensor, housed within said base unit, for sensing the depth thereof;

a processor chip, connectably attached to said depth sensor, for processing said base unit depth, said velocity gradient data from said plurality of velocimeters and the buoy GPS position from said buoy assembly using stored algorithms to back calculate the shape of said cable and the position of said base unit hydrophone therefrom;

a power supply, connected to said depth sensor and said processor chip, for supplying power thereto; and a controller, attached to said power supply, said processor chip, said tether cable and said depth sensor, for controlling the interoperability of said base unit components, said controller also distributing power to all other position locating apparatus components.

5. The system of claim 4 wherein said antenna is applied to the dry inner surface of said rubber structure above the water line.

6. The system of claim 4 wherein said antenna is formed by employing multi-retro-reflective technology applied on the portion of the exterior surface of the rubber structure that remains above the water line.

7. The system of claim 1 wherein said velocimeter means is a single Doppler velocimeter attached to said base unit, for determining the velocity gradient data at desired depths and transmitting said data to said base unit.

8. The system of claim 7 wherein said surface deployed buoy assembly further comprises:

an enclosed inflatable rubber structure, attached to said array tether cable, for supporting said cable while receiving and transmitting system data;

a GPS device, disposed within said floatation housing, for communicating with said satellite and acquiring accurate position location of said buoy;

an RF transmitter, disposed within said rubber structure, for communicating between said buoy assembly and said satellite; and an antenna, disposed on said rubber structure and connectably attached to said RF transmitter, for providing a link between said transmitter and said satellite.

9. The system of claim 8 wherein said bottom deployed base unit further comprises:

a depth sensor, housed within said base unit, for sensing the depth thereof;

a processor chip, connectably attached to said depth sensor, for processing said base unit depth, said velocity gradient data from said Doppler velocimeter and the buoy GPS position from said buoy assembly using stored algorithms to back calculate the shape of said cable and the position of said base unit hydrophone therefrom;

a power supply, connected to said depth sensor and said processor chip, for supplying power thereto; and a controller, attached to said power supply, said processor chip, said tether cable and said depth sensor, for controlling the interoperability of said base unit components, said controller also distributing power to all other position locating-apparatus components.

10. The system of claim 9 wherein said antenna is applied to the dry inner surface of said rubber structure above the water line.

11. The system of claim 9 wherein said antenna is formed by employing multi-retro-reflective technology applied on the portion of the exterior surface of the rubber structure that remains above the water line.

\* \* \* \* \*